Aug. 12, 1952  F. HAYNES  2,606,579
GUIDING SUPPORT FOR RECIPROCATING SAWS
Filed May 21, 1948
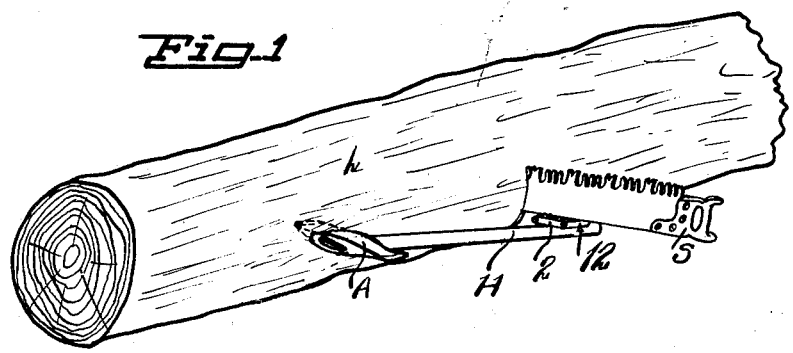
Fig. 1
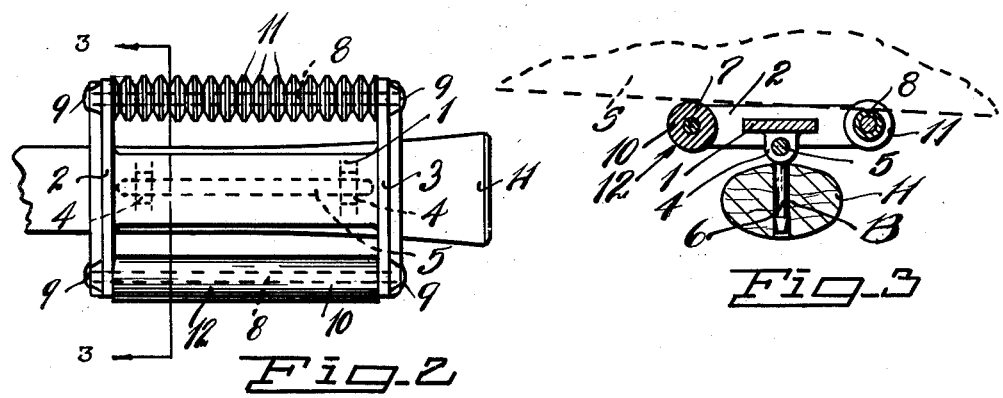
Fig. 2
Fig. 3
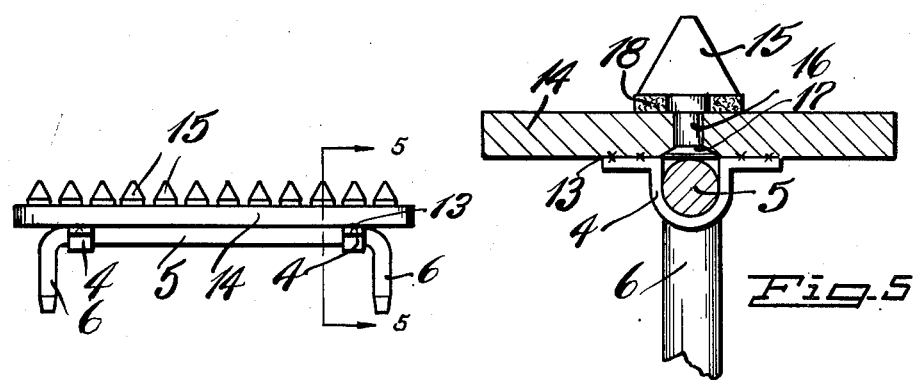
Fig. 4
Fig. 5
Fred Haynes
INVENTOR.
BY Glenn L. Fish
ATTORNEY Patented Aug. 12, 1952

2,606,579

UNITED STATES PATENT OFFICE 2,606,579

GUIDING SUPPORT FOR RECIPROCATING SAWS

Fred Haynes, St. Maries, Idaho

Application May 21, 1948, Serial No. 28,426

1 Claim. (Cl. 143—163)

The present invention relates to the general class of wood sawing appliances in which work-engaging guides are utilized for reciprocating saws, and more specifically to a guiding support for a reciprocating saw which while adapted for various purposes and uses, is especially designed for use with a hand operated reciprocating saw employed in cutting felled trees or logs. Usually the kerf is cut downwardly from the upper side of a felled tree or log; but in some instances where the log may have fallen over a swale or on rough ground the log is inaccessible for the usual cutting operation, and the saw must be operated to cut the kerf upwardly from the under side of the log. Under the latter condition efficient manipulation of the saw by the sawyer is extremely difficult, and the primary purpose of the invention is the provision of a portable saw guide that may readily be attached to a log and utilized for eliminating such difficulty, decreasing the expenditure of time and labor, and for increasing the efficiency in the log-cutting operations.

To this end the invention consists in certain novel features of construction and combinations and arrangements of parts involving a portable support including means for attaching it to a log, and an oscillatable frame having guides for the smooth edge of a saw, as will hereinafter be described and more particularly set forth in the appended claims. As an auxiliary article of manufacture the guiding support includes a minimum number of parts that may with facility be manufactured with low cost of production, and the parts may be assembled with convenience to insure a durable appliance that may be set up with ease, which automatically performs its functions with efficiency, and which may readily be adjusted for working conditions, and easily detached after the work is finished.

In the accompanying drawings I have illustrated two physical embodiments of my invention in which the parts are combined and arranged in accord with modes I have devised for the practical application of the principles of my invention; it will however be understood that changes and alterations are contemplated and may be made in these exemplifying drawings and mechanical structures, within the scope of my claims, without departing from the principles of the invention.

Figure 1 is a perspective view showing a log upon which the supporting guide is mounted and illustrating the operation of a reciprocating saw.

Figure 2 is an enlarged detail plan view showing part of an axe handle upon which the supporting guide is mounted.

Figure 3 is a transverse sectional view at line 3—3 of Fig. 2.

Figure 4 is a view in side elevation of a modified form of the supporting guide; and Figure 5 is an enlarged sectional view at line 5—5 of Fig. 4.

In order that the general arrangement and utility of parts may readily be understood I have shown in the perspective view a portion of a felled log L, an axe with its head A embedded in the log, and its handle H, which possesses usual resiliency, extends longitudinally of the log with its free end in position to support the attached saw guide. The hand operated saw S is shown cutting a kerf upwardly from the under side of the log, and it will be understood that the axe may be removed and replaced as a support for the guide as the depth of the kerf increases.

In adapting the axe handle as a resilient support for the sawguide, the handle is bored at B to form two spaced sockets which are utilized in quick attachment, and in detachment, of the saw guide.

In carrying out my invention, the saw guide as an auxiliary attachment is equipped with a teeter or rock frame that is capable of oscillating with the reciprocating movement of the reciprocating saw, and the frame includes a central flat bar or plate 1 having integral cross bars or end heads 2 and 3. The frame is initially mounted with its longitudinal axis across the direction of travel of the reciprocating saw, and the under side of the central plate 1 is equipped with a spaced pair of perforated ears or brackets 4, 4 in which the horizontal bar 5 of a supporting yoke is journaled to permit rocking of the frame, and this yoke is fashioned with bent ends 6, 6 forming attaching pins that are slipped into the sockets or bores B of the axe handle.

The frame is thus mounted to rock or oscillate on the fixed yoke that is supported in the resilient handle of the axe, and the rock frame is equipped with a pair of parallel, spaced pins or rods 7 and 8 that extend transversely of the saw, and unite the spaced heads 2 and 3 of the rock frame. These spaced bearing rods or journals are provided with suitable end heads 9 for securing them in the frame, and a pair of rotary saw guides are mounted on the rods for co-action with the back edge, or smooth edge of the reciprocating saw.

One of the pins, as 8 forms the journal bearing for a tubular roller 10 that is notched to form spaced disks 11, and the notched or grooved roller provides a selected one of several saddles through which the smooth edge of the saw may reciprocate. The other pin 7 is provided with a tubular roller 12 that co-acts with the notched roller in supporting and guiding the movement of the saw.

In the modified form of the invention illustrated in Figs. 4 and 5 the saw guide is equipped with means for retaining a quantity of liquid lubricant to lubricate the back of the saw, thus reducing friction on the support and allowing smooth operation.

In this form of the invention the yoke 5 with its attaching pins 6, 6 provides a journal for the brackets 4 that are welded, as at 13 to the underside of a rock frame or oscillatable plate 14, and the plate is equipped with a row of spaced studs 15 of conical shape that form the guide notches or saddles through which the smooth edge or back of the saw reciprocates.

These centrally arranged studs have shanks 16 passed through perforations or spaced holes in the rock plate, and the studs are secured by rivet heads 17 in the perforated plate. For absorbing a lubricant, as kerosene, each stud is provided with a porous washer 18 interposed as a pad between the stud and the rock-plate. When the pitch in a log adheres to the saw, it is general practice to apply a quantity of kerosene to the blade to cut this pitch. The kerosene will run to the back edge of the saw and be absorbed by the pads 18, thus lubricating the back of the saw on the rock-plate. However, the woodsman may apply any type of lubricant to the pads he may deem advisable.

Having thus fully described my invention, what I claim as new and desire to secure by Letters Patent is:

In a support for a reciprocating saw including an axe embedded in a log and a resilient handle for the axe formed with transverse openings spaced from each other longitudinally of the handle, a yoke having a bridge and arms extending downwardly therefrom and removably fitting into the openings in the axe handle, a teeter frame having a longitudinally extending bar and cross bars rigid with ends of the longitudinally extending bar and projecting from opposite sides thereof, rods disposed in spaced relation to opposite sides of said longitudinally extending bar and secured at their ends to ends of the cross bars, and rollers rotatably mounted about said rods and constituting rotatable members upon which the back of a saw rests, one of said rollers being formed with circumferentially extending grooves defining spaced disks between selected ones of which the saw fits.

FRED HAYNES.

REFERENCES CITED

The following references are of record in the file of this patent:

UNITED STATES PATENTS

| Number | Name | Date |
| --- | --- | --- |
| 121,373 | Ide | Nov. 28, 1871 |
| 334,175 | Kratzer | Jan. 12, 1886 |
| 365,441 | Larsh | June 28, 1887 |
| 938,367 | Bryant | Oct. 26, 1909 |
| 993,838 | Kessler | May 30, 1911 |
| 1,016,090 | Perry | Jan. 30, 1912 |
| 1,428,268 | Solomon | Sept. 5, 1922 |
| 1,564,448 | Roget | Dec. 8, 1925 |
| 1,761,249 | Auvil | June 3, 1930 |